US008095460B2

(12) United States Patent
Ghosh et al.

(10) Patent No.: US 8,095,460 B2
(45) Date of Patent: Jan. 10, 2012

(54) DETERMINATIONS RELATING TO RESOURCE DISTRIBUTION

(75) Inventors: Debashis Ghosh, Charlotte, NC (US); Yanghong Shao, Charlotte, NC (US); Thayer S. Allison, Jr., Charlotte, NC (US); Kurt D. Newman, Matthews, NC (US); David Joa, Irvine, CA (US); Marc Douglas Halsted, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 25 days.

(21) Appl. No.: 12/785,172

(22) Filed: May 21, 2010

(65) Prior Publication Data

US 2010/0235271 A1   Sep. 16, 2010

Related U.S. Application Data

(63) Continuation-in-part of application No. 11/740,130, filed on Apr. 25, 2007, now Pat. No. 7,734,539.

(51) Int. Cl.
*G06Q 40/00* (2006.01)
(52) U.S. Cl. .............................. 705/38; 705/37; 705/35
(58) Field of Classification Search ................ 705/38
See application file for complete search history.

(56) References Cited

U.S. PATENT DOCUMENTS

| 5,930,776 | A | 7/1999 | Dykstra et al. | |
|---|---|---|---|---|
| 6,658,393 | B1 * | 12/2003 | Basch et al. | 705/38 |
| 6,764,003 | B1 | 7/2004 | Martschitsch et al. | |
| 2002/0095363 | A1 | 7/2002 | Sloan et al. | |
| 2002/0138418 | A1 * | 9/2002 | Zarin et al. | 705/38 |
| 2002/0198822 | A1 | 12/2002 | Munoz et al. | |
| 2004/0049402 | A1 | 3/2004 | Dojo et al. | |
| 2004/0177030 | A1 | 9/2004 | Shoham | |
| 2004/0186807 | A1 | 9/2004 | Nathans et al. | |
| 2005/0010506 | A1 | 1/2005 | Bachann | |
| 2005/0177501 | A1 | 8/2005 | Thomas | |
| 2005/0187860 | A1 | 8/2005 | Peterson et al. | |
| 2005/0273430 | A1 | 12/2005 | Pliha | |
| 2006/0161487 | A1 | 7/2006 | Saxena et al. | |
| 2006/0242047 | A1 * | 10/2006 | Haggerty et al. | 705/35 |
| 2007/0156554 | A1 * | 7/2007 | Nikoley et al. | 705/35 |

OTHER PUBLICATIONS

Boufford, John. (Oct. 2000). Credit cards could have no limits [Transaction would not work unless funds were previously transferred into credit card bank account]. ComputerWorld Canada, 16(21), 21.*

(Continued)

*Primary Examiner* — Alexander Kalinowski
*Assistant Examiner* — Abhishek Vyas
(74) *Attorney, Agent, or Firm* — Banner & Witcoff, Ltd.; Michael A. Springs

(57) ABSTRACT

Systems and methods that may determine whether to provide a resource to a consumer are disclosed. Further methods may allow distributing resources on an expedited basis or recheck previous determinations to provide a resource. In certain embodiment, resource transactions may be categorized. Illustrative categories may be organized by: investment, a non-investment expenditure, or income. In one embodiment, transactions categorized as non-investment expenditures may be categorized into subcategories, including necessities, discretionary, or debt. Calculations may be performed upon the categorized (and/or sub-categorized data). For example, one or more of the following ratios may be calculated: debt-to-income, investment-to-income, and expenditure-to-income. Ratios may be compared to one or more threshold values. Determinations of the threshold may consider information regarding other individuals' or business' resource transactions.

20 Claims, 3 Drawing Sheets

OTHER PUBLICATIONS

E3 Corp. Acquires Market Data Solutions, Inc. and eMillenium, Inc. To Take Demand-based Inventory Forecasting to the Next Level. (Apr. 17). PR Newswire,1.*

Lengyel, Zoltan; International Financial Law Review, v19n5 PP; 73; May 2000, ISSN 0262-6969 JRNL CODE: IFL.

Kelly J. Andrews; Target Marketing, v 23, n 1, p. 22; Jan. 2000. Copyright Phillips Business Information, Inc.; Credit Risk Management Report, v9, n3, pNA; Feb. 22, 1999.

Scientific and Technical Information Center; EIC 3600 Search Results, pp. 1-89, Nov. 4, 2009.

PCT International Search Report mailed Jan. 15, 2009, PCT/US08/61425, 9 pages.

PCT International Preliminary Report on Patentability, PCT/US2008/061425, mailed Nov. 5, 2009, 7 pages.

* cited by examiner

DETERMINATIONS RELATING TO RESOURCE DISTRIBUTION

CROSS REFERENCES TO RELATED APPLICATION

This application is a continuation-in-part of and claims priority to U.S. patent application Ser. No. 11/740,130 entitled, "Calculating Credit Worthiness Using Transactional Data", which was filed on Apr. 25, 2007, and which is herein incorporated by reference in its entirety.

BACKGROUND

Technological innovations, particularly in the communications fields, have led to improved systems and method for efficient delivery and analysis of information. For example, documents previously delivered by facsimile often required manual data entry to permit the accurate analysis of specific information within the documents. Now, electronic mail (e-mail), instant messaging (IM), file transfer sites, such as using the file transfer protocol, allow the quick delivery and utilization of large amounts of information.

Following this trend, transactions of many resources can now be conducted electronically. Financial institutions began allowing individuals to apply for and manage resources, such as lines of credit, using electronic mechanisms. While certain aspects have increased latency periods, certain aspects still lag behind ideal conditions.

Many techniques for processing applications for certain resources, such as revolving credit accounts, use inefficient and/or inaccurate measures to determine whether to provide the resource to certain individuals. This is especially true for certain individuals, who are less likely to default, and thus should be approved on a quicker pace in certain instances.

Currently, analysis of credit scores and an estimated loan-to-value (LTV) provided by third-party credit bureaus are used to determine whether to provide a resource. Unfortunately, the estimated LTV alone is often insufficient and/or outdated to assist making a reliable determination. Similarly, a credit score only provides certain information that is either only partially helpful or not helpful at all. Furthermore, this information may be outdated, and credit scores may actually increase as consumers take out more credit, thus potentially increasing the percentage of credit already being utilized by a consumer. Nonetheless, many current systems and methods do not provide enough pertinent and/or accurate information to allow a quick determination regarding whether to provide a resource, such as a revolving credit account, to the consumer. Unfortunately, delays in processing applications may lead to an entity losing an individual as a potential consumer, or retaining one. Without the resource, whether a physical good (such as an automobile) or service (such as providing a line of credit), the consumer may have trouble retaining or obtaining employment, necessities, or even other items they wish to seek. Further, many current systems cannot allow a third party to determine whether to pre-approve a specific individual and/or to invite a consumer to apply for a resource.

Systems and methods that improve upon one or more of these and other deficiencies would be desirable.

BRIEF SUMMARY

Aspects of the embodiments disclose methods, computer readable media, and apparatuses configured to readily determine whether to provide a resource to a consumer. In certain embodiments, systems and/or methods may be implemented to identify consumers that may be provided a resource on an expedited basis.

In accordance with one embodiment, several resource transactions may be categorized. The resource transactions may be for different resources, including but not limited to, goods and/or services. Transactions may involve the exchange of physical goods in exchange for currency. In certain embodiments, transactions may be assisted through the use of a third-party, such as a financial institution. Categorization systems and methods may use information associated with one or more electronic accounts of the consumer, such as checking, savings, and/or investments accounts.

Illustrative categories may include, for example, investments, non-investment expenditures, or income. In certain embodiments, transactions may be categorized before being received at a certain device or memory. In one embodiment, only transactions conducted during a specific time frame are utilized. For example, resource transactions conducted within about the previous 6 month period may be used in one embodiment. Different time periods may be utilized in accordance with other embodiments.

At least a portion of the categorized transactions may further be categorized into a sub-category. Those skilled in the art with the benefit of this disclosure will readily appreciate that what may be referred to as a sub-category in one embodiment may serve as a category in another embodiment and vice-versa. In one embodiment, transactions categorized (or would be categorized) as non-investment expenditures may be further categorized into subcategories. In one embodiment, at least a portion of the sub-categories may include: necessities, discretionary, and debt.

In certain embodiments, calculations may be performed upon the categorized (and/or sub-categorized) data. In one embodiment, at least one ratio may be calculated. For example, one or more of the following ratios may be calculated: debt-to-income, investment-to-income, and expenditure-to-income. One or more ratios of a first user's resource transactions may be compared to one or more threshold values for the ratio(s). In certain embodiments, one or more comparisons may be utilized to determine whether to provide a resource to the first user. Determinations of the threshold may consider information related to other individuals' or business' resource transactions. In one embodiment, the individuals or businesses may be those that: were extended the same or similar resource, not extended the same or similar resource, and/or those withdrawn from consideration of the same or similar resource.

In one embodiment, the resource transactions used in calculating the threshold may be categorized in the same or a similar manner as the first user's resource transactions. In certain embodiments, at least one of the same ratios calculated for the first user is calculated for the other individuals or businesses. Information from other individuals or businesses may be used to generate ratios or related information (such as averages) of the ratios for the group of individuals or businesses. In certain embodiments, the threshold is such that at least a portion of the individuals' and/or business' have a calculated ratio that is below the threshold for that ratio. The determination of a threshold may be assigned according to a percentage of the individuals that do not meet a threshold for that ratio.

In certain embodiments, a determination that a first threshold is met may prompt a calculation or determination of one or more additional thresholds. In one embodiment, based upon whether the debt-to-income ratio of the first user meets a threshold, a second ratio of the first user may be compared to a threshold for that second ratio. In another embodiment, a master ratio may be utilized instead of or in addition to several ratios. In one embodiment, two or more ratios may be combined to form a master ratio.

One or more of these ratios and/or thresholds may be separately and/or collectively analyzed in view of further attributes. Attributes may be previously calculated and/or obtained. Alternatively, an attribute may be determined during or after one or more processes disclosed herein. Illustrative attributes may include, for example, FICO® scores, and/or loan-to-value ratios. Aspects of the embodiments may be provided in a computer-readable medium having computer-executable instructions to perform one or more of the process steps described herein. These and other aspects of the embodiments are discussed in greater detail throughout this disclosure, including the accompanying drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Figure 1:
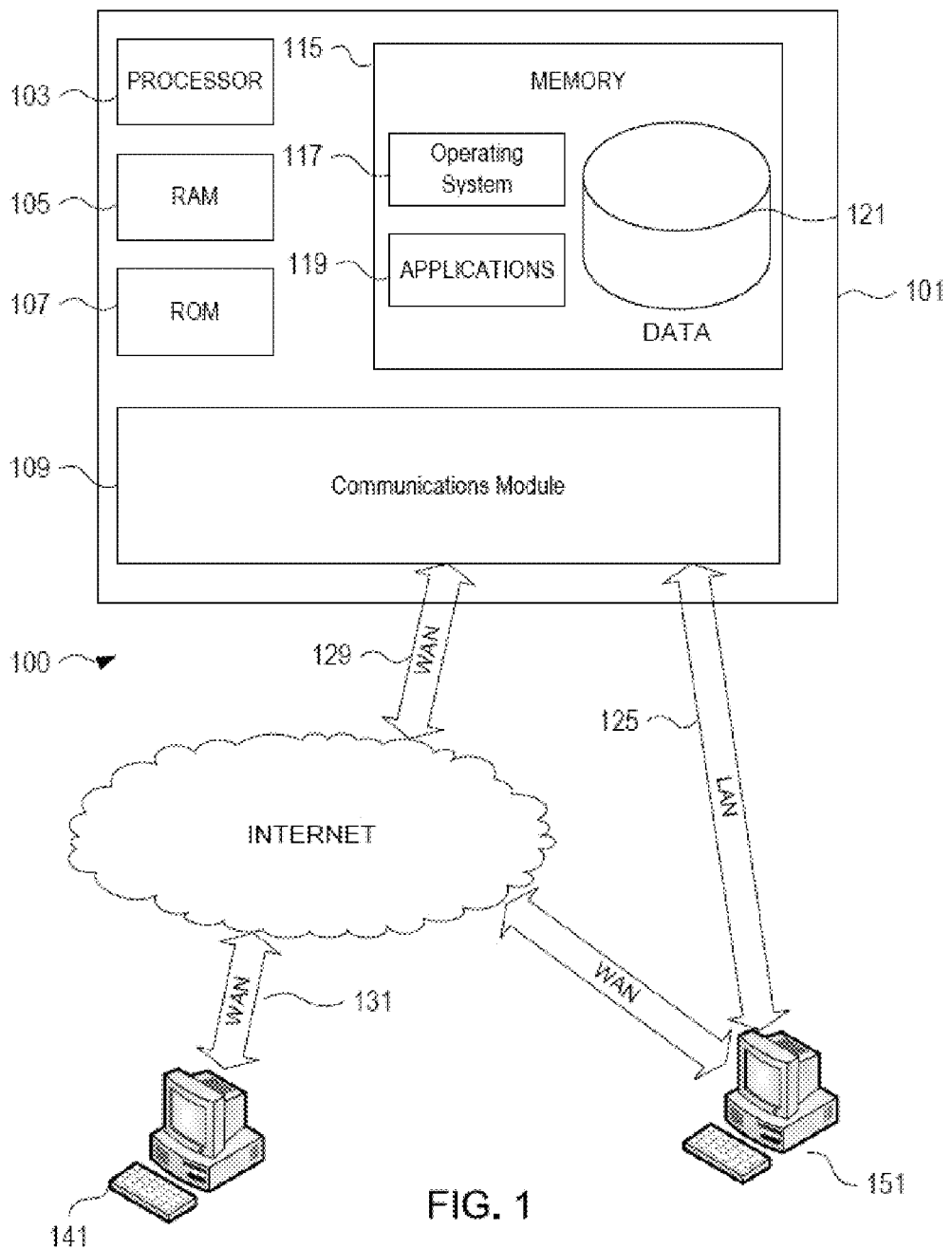
FIG. 1 shows an illustrative operating environment in which various aspects of the embodiments may be implemented.
Figure 2:
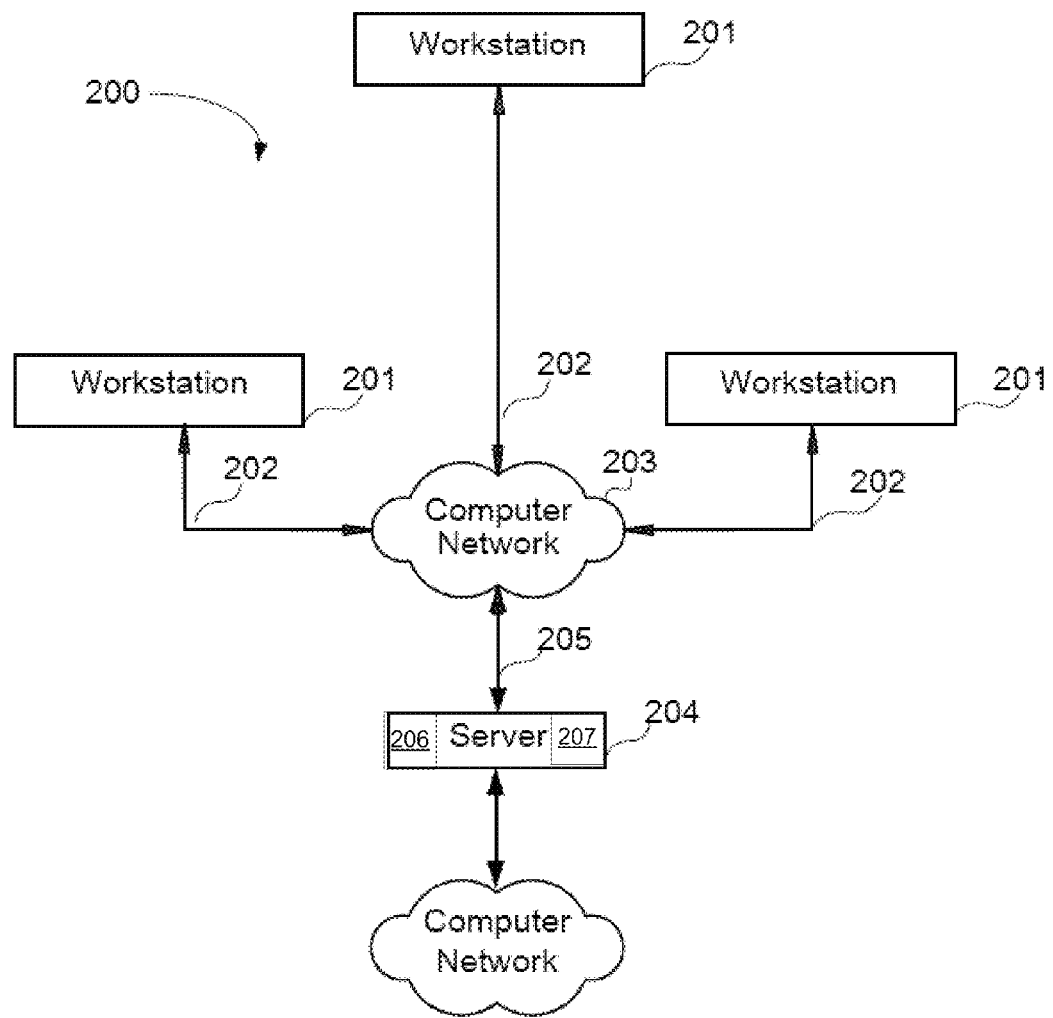
FIG. 2 is an illustrative block diagram of workstations and servers that may be used to implement the processes and functions of certain aspects of the embodiments.
Figure 3:
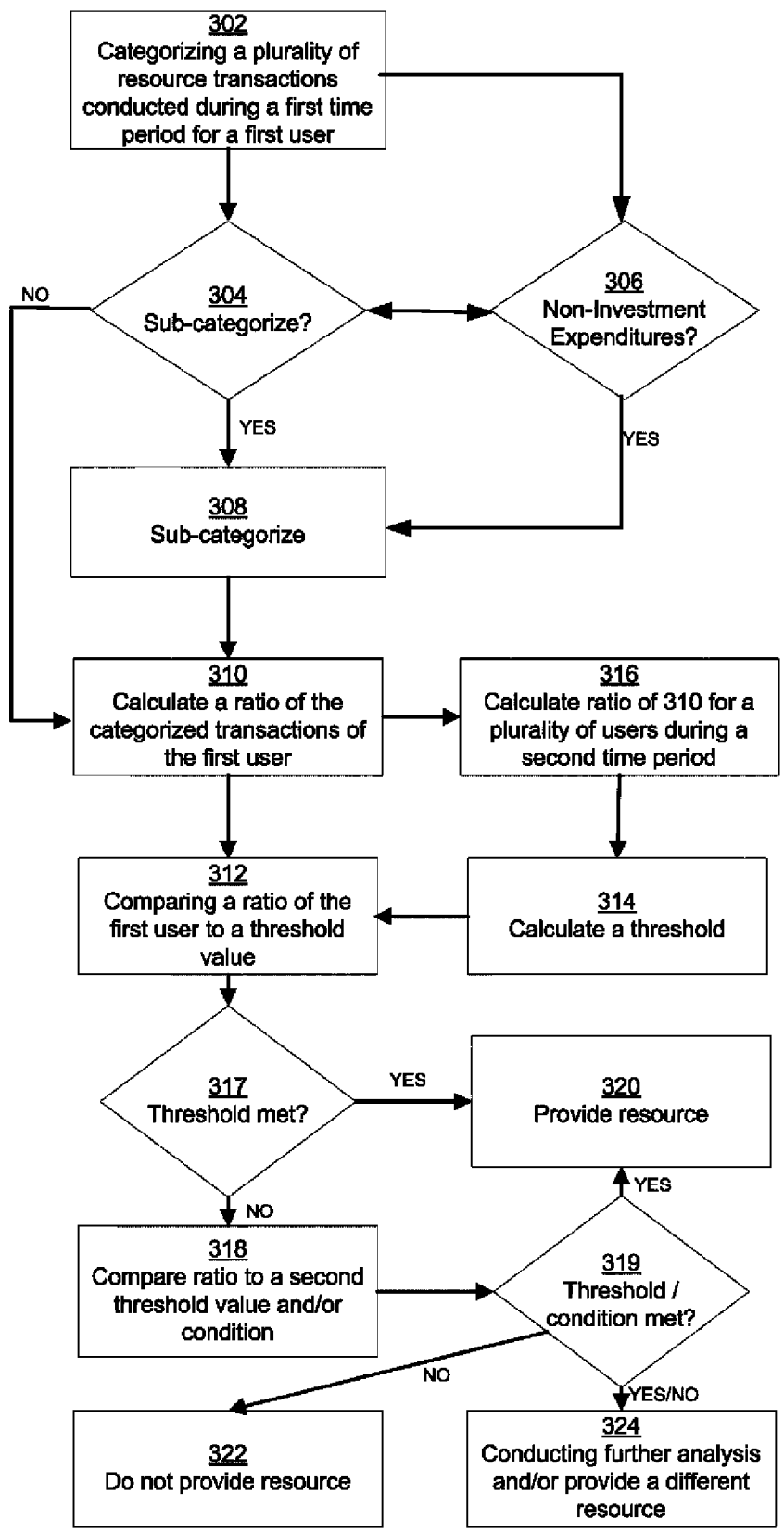
FIG. 3 shows a flow diagram of an illustrative process in accordance with one exemplary embodiment of the invention.

In accordance with various aspects of the embodiments, methods, computer-readable media, and apparatuses are disclosed that may be utilized to determine whether to provide resources to an individual or entity. Other aspects relate to determining whether to expedite the determination of providing resources. FIG. 1 illustrates an example of a suitable computing system environment 100 (e.g., for which may be part of illustrative system 200 and/or perform one or more aspects of illustrative process 300 (as shown in FIGS. 2 and 3, respectively). The computing system environment 100 is only one example of a suitable computing environment and is not intended to suggest any limitation as to the scope of use or functionality of the embodiments. Further, the computing system environment 100 should not be interpreted as having any dependency or requirement relating to any one or combination of components shown in the illustrative computing system environment 100.

The embodiments are operational with numerous other general purpose or special purpose computing system environments or configurations. Examples of well known computing systems, environments, and/or configurations that may be suitable for use with the embodiments include, but are not limited to, personal computers, server computers, handheld or laptop devices, multiprocessor systems, microprocessor-based systems, set top boxes, programmable consumer electronics, network PCs, minicomputers, mainframe computers, databases, distributed computing environments that include any of the above systems or devices, and the like.

With reference to FIG. 1, the computing system environment 100 may include a computing device 101 wherein the processes discussed herein may be implemented. The computing device 101 may have a processor 103 for controlling overall operation of the computing device 101 and its associated components, including RAM 105, ROM 107, communications module 109, and memory 115. Computing device 101 typically includes a variety of computer readable media. Computer readable media may be any available media that may be accessed by computing device 101 and include both volatile and nonvolatile media, removable and non-removable media. By way of example, and not limitation, computer readable media may comprise a combination of computer storage media and communication media.

Computer storage media include volatile and nonvolatile, removable and non-removable media implemented in any method or technology for storage of information such as computer readable instructions, data structures, program modules or other data. Computer storage media include, but is not limited to, random access memory (RAM), read only memory (ROM), electronically erasable programmable read only memory (EEPROM), flash memory or other memory technology, CD-ROM, digital versatile disks (DVD) or other optical disk storage, magnetic cassettes, magnetic tape, magnetic disk storage or other magnetic storage devices, or any other medium that can be used to store the desired information and that can be accessed by computing device 101.

Communication media typically embodies computer readable instructions, data structures, program modules or other data in a modulated data signal such as a carrier wave or other transport mechanism and includes any information delivery media. Modulated data signal is a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media.

Although not shown, RAM 105 may include one or more are applications representing the application data stored in RAM memory 105 while the computing device is on and corresponding software applications (e.g., software tasks), are running on the computing device 101. In one embodiment, RAM 105 and/or any other memory may include a security application. The security application may assist in monitoring activity of one or more user accounts on one or more other devices, such as devices 141 and 151, which are described in more detail below.

Communications module 109 may include a microphone, keypad, touch screen, and/or stylus through which a user of computing device 101 may provide input, and may also include one or more of a speaker for providing audio output and a video display device for providing textual, audiovisual and/or graphical output.

Software may be stored within memory 115 and/or storage to provide instructions to processor 103 for enabling computing device 101 to perform various functions. For example, memory 115 may store software used by the computing device 101, such as an operating system 117, application programs 119, and an associated database 121. Alternatively, some or all of the computer executable instructions for computing device 101 may be embodied in hardware or firmware (not shown). As discussed above, memory 115 may comprise one or more security applications, some of which will be described below.

Database 121 may provide centralized storage of response information. Processor 103 may access the response information from database 121 and process the response information that may be included in an interactive response to a user. While database 121 is shown to be internal to computing device 101, database 121 may be external to computing device 101 with some embodiments.

Computing device 101 may operate in a networked environment supporting connections to one or more remote computing devices, such as user terminals 141 and 151. Additional computing devices and the arrangement of such devices are described in illustrative embodiment shown in FIG. 2. The user computing devices 141 and 151 may be personal computing devices or servers that include many or all of the elements described above relative to the computing device 101.

The network connections depicted in FIG. 1 include connections through multiple networks. For example, in one embodiment, a local area network (LAN) 125, may be an organization's intranet, and a wide area network (WAN) 129, may be the Internet. In one embodiment implementing a LAN networking environment, computing device 101 may be connected to the LAN 125 through a network interface or adapter in the communications module 109. When used in a WAN networking environment, the server 101 may include a modem, or interface in the communications module 109 or other means for establishing communications over the WAN 129, such as the Internet 131. Thus, from a security perspective, one user account may be configured to access a LAN, such as LAN 125, however, not to access one or more WANs, such as WANs 129/130.

It will be appreciated that the network connections shown are illustrative and other means of establishing a communications link between the computing devices may be used. The existence of any of various well-known protocols such as TCP/IP, Ethernet, FTP, HTTP and the like is presumed, and the system can be operated in a client-server configuration to permit a user to retrieve web pages from a web-based server. Any of various conventional web browsers can be used to display and manipulate data on web pages.

Additionally, one or more application programs 119 used by the computing device 101, and/or user terminals 141/151 according to an illustrative embodiment, may include computer executable instructions for invoking user functionality related to communication including, for example, email, short message service (SMS), and/or other targeted communications applications that transmit communications from a user account to a second user account (whether internal or external to the organization or domain of the first user account).

Embodiments of the invention may include forms of computer-readable media. Computer-readable media include any available media that can be accessed by a computing device 101. Computer-readable media may comprise storage media and communication media. Storage media include volatile and nonvolatile, removable and non-removable media implemented in any method or technology for storage of information such as computer-readable instructions, object code, data structures, program modules, or other data. Communication media include any information delivery media and typically embody data in a modulated data signal such as a carrier wave or other transport mechanism.

Although not required, one of ordinary skill in the art will appreciate that various aspects described herein may be embodied as a method, a data processing system, or as a computer-readable medium storing computer-executable instructions. For example, a computer-readable medium storing instructions to cause a processor to perform steps of a method in accordance with aspects of the embodiments is contemplated. For example, aspects of the method steps disclosed herein may be executed on a processor on a computing device 101. Such a processor may execute computer-executable instructions stored on a computer-readable medium.

Referring to FIG. 2, an illustrative system 200 for implementing methods according to some embodiments is shown. As illustrated, system 200 may include one or more workstations 201. In one embodiment, workstations 201 are similar to user terminals 141/151 shown in FIG. 1. Workstations 201 may be local or remote, and are connected by one of communications links 202 to computer network 203 that is linked via communications links 205 to server 204. In system 200, server 204 may be any suitable server, processor, computer, or data processing device, or combination of the same. Server 204 may be used to process the instructions received from, and the transactions entered into by, one or more participants. In certain embodiments, server 204, or any other computer device, such as those illustratively shown in FIG. 1 and/or FIG. 2 may include a transaction categorizer 206 and/or a threshold determination module 207. Illustrative transaction categorizers will be discussed in more detail later in this disclosure.

Computer network 203 may be any suitable computer network including the Internet, an intranet, a wide-area network (WAN), a local-area network (LAN), a wireless network, a digital subscriber line (DSL) network, a frame relay network, an asynchronous transfer mode (ATM) network, a virtual private network (VPN), or any combination of any of the same. Communications links 202 and 205 may be any communications links suitable for communicating between workstations 201 and server 204, such as network links, dial-up links, wireless links, hard-wired links, etc.

With some embodiments, illustrative system 200 may support an interactive system as will be further discussed. For example, workstations 201 may function as user terminals and server 204 may function as a reception system that receives information regarding resource transactions of multiple users on workstations 201. As understood by those skilled in the art, the steps that follow in the FIGS may be implemented by one or more of the components in FIGS. 1 and 2 and/or other components, including other computing devices.

Aspects are directed towards providing or offering resources to one or more individuals. Certain aspects relate to determining whether to extend certain resources to individuals. FIG. 3 shows an illustrative flowchart 300 that may be used to assist in one or more implementations according to various embodiments disclosed herein. In accordance with one embodiment, a plurality of resource transactions of a first user may be calculated (see, e.g., block 302). The transactions may relate to goods or services. In one embodiment, the resource(s) may comprise monetary funds, such as dollars, yen, pesos, Euros, and/or other forms of currency, whether represented physically and/or electronically. In certain embodiments, the resource(s) comprise a revolving credit account. In other embodiments, however, the resource may comprise physical goods, such as property. As used herein, a "resource" may be any good or service may be exchanged between two or more parties, for example, an exemplary transaction may involve both a non-financial physical good (i.e., an automobile) in exchange for financial compensation (i.e., transfer of electronic funds representing currency).

In one embodiment, one or more resource transactions may be first retrieved from one or more accounts associated with the first user. In certain embodiments, resource transactions may be received from a checking accounts, savings accounts, investment accounts, credit accounts, or combinations of one or more of these. In this regard, the credit accounts may comprise revolving credit accounts, mortgages, or any similar credit account. In certain implementations, different accounts may be managed by a single financial institution, however, in further embodiments, at least a portion of transactions relate to accounts managed by different entities. In one embodiment, one or more "user accounts" comprising resource transactions may be associated with a particular individual, such as a member of a family. Yet, in other embodiments, the "user" may be a collection of individuals, such as a family unit, a partnership, or any organization. Thus, in one embodiment, a first member of a group (such as a partner in a partnership) may perform an investment transaction, such as using user terminal 141, user terminal 151, or any workstation 201, and that partner's actions may be tied to a particular user account with another individual's actions, such as providing income (automatic or as a one-time deposit) using, for example, user terminal 141, user terminal 151, or any workstation 201. In an alternative embodiment, a "user account" may be associated with a particular computing device, such as a mobile device. For example, in one embodiment, a particular computing device, such as user terminal 141, may be associated with a specific user account. In another embodiment, a "user account" may be a combination of specific user(s) on specific computing device(s).

Information regarding resource transactions may be transmitted and/or received on an ongoing basis. Yet, in other embodiments, at least a portion of the data is first collected on a computer-readable medium(s) and then transmitted to a second computer-readable medium(s) after a predetermined collection period. For example, transactional information may travel through computer network 203, via communications link 205 to server 204. In one embodiment, the electronic data may be received on about a daily basis. The received data may comprise information collected during a first time period, such as the preceding day or 24 hour period.

In one embodiment, a user may direct that unrelated transactions, such as transactions held by different entities, be transmitted to or aggregated by an entity. The aggregating entity may be any entity, including a financial institution, and/or a party to one of the transactions of resources being aggregated. In certain embodiments, an entity identifier may be provided to one or more users. The entity identifier may be any indicia configurable to allow the association of one or more resource transactions to an aggregating entity. For example, in one embodiment, the entity identifier may be a Universal Resource Link (URL), electronic mail (e-mail) address, or other electronic address that the user may provide to a third party, such as a service provider. For example, a user may electronically receive a monthly utility bill, such as through e-mail and/or through accessing a secure web server. The user may, in addition to or instead of, receiving the electronic delivery of the utility bill, utilize an entity identifier to direct delivery of the utility bill to the aggregating entity. The aggregating entity may, subject to the user's permission, format and/or analyze transactions therein, including payments or credits in regards to goods and/or services. In certain embodiments, an entity identifier may designate a physical address to which physical items, including commercial paper, bills, or assets, such as commodities and metals, may be delivered. In certain embodiments, one or more processes may be utilized to convert any information on, within, or associated with physical resources to electronic format, including but not limited to, Optimal Character Recognition (OCR).

The categorization (for example, at block 302) of the resource transactions may be based on a myriad of factors. In one embodiment, the categorization of one or more transactions may be determined by an organization determining whether to provide a resource to the user. For example, at least a portion of categories utilized if a user was applying for a home loan may be different if the user was applying for a loan for a boat or automobile. In one embodiment, the plurality of resource transactions may be categorized according to whether the transactions comprise an 1) investment, 2) a non-investment expenditure, or 3) income. In one embodiment, the categorization may be at least partially performed with a transaction categorizer, such as transaction categorizer 206. In certain embodiments, a transaction categorizer (such as categorizer 206) may utilize information regarding the transaction, including but not limited to, the product or service being transacted, the transacting parties, and/or the amount of resources extended or provided. In certain implementations, the categorization of resource transactions has already been performed. Thus, in at least some of those embodiments, only categorized data may be received.

In certain embodiments, information regarding transactions may be submitted by the parties conducting the transaction, by the user before or after the transaction, or from a third-party. In one embodiment, categorization may be determined by the goods and/or services provided by an entity. In certain embodiments, routine deposits into a certain account may be deemed income. Likewise, certain withdrawals to a brokerage house may be considered an investment. Additional systems and methods of categorization are described below in relation to blocks 304-308, of which may be utilized as part of one or more processes described in relation to block 304 or any categorization discussed herein.

Systems and methods may be implemented, (either as part of or separately from, one or more processes related to block 302) to ensure that aggregating entities and/or third-parties protect the privacy rights of the user and/or ensure that certain private or confidential data is not utilized in any unauthorized manner. For example, it is conceivable that one or more resource transaction may relate to medical services. Thus, certain embodiments may exclude any transactions relating to medical services. Further implementations may ensure that not only is private information not used, but it is also held in a confidential manner or purged from certain databases or computer-readable medium as to prevent inadvertent disclosure. In certain embodiments, individuals may determine or select which transactions are either 1) purged from the system 2) not utilized in certain processes and/or 3) partially masked where at least some information regarding the resources transaction is not utilized.

Depending on the embodiment, further sub-categorization may be performed. For example, block 304 may occur to determine whether to further categorize data received (or categorized) at block 302. One or more processes may be implemented to determine if a specific category of transaction is represented within the categorized transactions. For example, block 306 may occur to first determine if non-investment expenditures are located within the resource transactions. For example, in one embodiment, a sub-component of determining whether to cub-categorize at block 304 may be to determine whether there are any non-investment expenditures within the transactions (i.e., block 306). If so, block 308 may be conducted to perform one or more sub-categorization processes. Alternatively, block 306 may be performed directly from block 302, and as such serve as the sub-categorization determination. Yet in another embodiment, block 306 is merely one of several inputs that are used to determine whether to sub-categorize certain resource transactions. In this regard, the processes shown in blocks 304 306 and/or 308 may be omitted without departing from the scope of this disclosure. In this regard, any processes that may occur at step 308 may be part of one or more processes discussed in relation to block 302.

In one embodiment, it may be determined from block 306 that the resource transaction comprise non-investment expenditures. In one embodiment, at least a portion of non-investment expenditures may be sub-categorized into a sub-group, such as for example, necessities, discretionary, debt and combinations thereof. In certain embodiments, only a portion of the non-investment expenditures, such as those representing debt, may be sub-categorized. Exemplary goods and/services or economic sectors may be identified as discretionary or necessity. While an illustrative listing of economic sectors are below, those skilled in the art will readily appreciate that they are merely illustrative and the embodiments disclosed herein are not limited to these listings. Further, certain transactions falling within one economic sector may be considered discretionary while other transactions may be considered a necessity. For example, transportation to work may be a necessity but transportation to a Caribbean island may be categorized as discretionary. In one implementation, certain transactions for goods or services in an economic sector may be classified as necessity but other transactions over a certain threshold may be considered discretionary. Further, aggregated transactions that when combined meet a threshold may cause some transactions to be considered discretionary. One illustrative listing of economic sectors may include:

1. Airlines
2. Automobiles
3. Brokerage
4. Business Income
5. Business Contractors/Supply
6. Cash
7. Charities & Donation
8. Coffee Stores
9. Computer Hardware/Software
10. Craft stores
11. Drug Stores/Pharmacy
12. Debt Payments (not including Credit Cards with zero revolving balance)
13. Education (Schools, Colleges, Universities, Vocational)
14. Electronic Stores, retailers (online retailers)
15. Entertainment
16. Financial Services
17. Fitness
18. Gas Stations
19. Grocery Stores
20. Hair Care
21. Health care
22. Home Improvement Stores
23. Income
24. Insurance
25. Internet Service Providers
26. Lodging
27. Magazine Subscriptions
28. Mortgage Debt Payments
29. Other Income
30. Parking
31. Pet Stores
32. Phone Service
33. Prepaid Cards
34. Rental Cars
35. Restaurants
36. Discount Retailers
37. Non-Discount Retailers
38. Retirement Income
39. Satellite TV/Cable TV
40. Small Businesses
41. Smoothie Stores
42. Travel Services
43. Utilities
44. Wireless Phone Service In one embodiment, the determination of an economic sector may be based, at least in part, on a Standard Industrial Classification (SIC), for example as utilized by the Internal Revenue Service of the U.S. Government. In yet another embodiment, the determination may be based, at least in part, on a Merchant Category Code (MCC), for example, as utilized by Visa®. Those skilled in the art with the benefit of this disclosure will appreciate that other classifications may be used without departing from the scope of this disclosure. Further, in certain embodiments, one process may provide results as set forth in the different illustrative processes described in relation to blocks 302-308. In this regard, Table 1.1 (shown below), shows further classification of illustrative "necessity" transaction.

TABLE 1.1

| Sub-Category | Necessity Description |
| --- | --- |
| FD | Food Stores |
| GS | Gasoline |
| DR | Drug stores |
| SH | Health care |
| SU | Utilities |
| UTI | Utility payment |
| PHN | Telephone |
| CTV | Cable TV or satellite TV/radio |
| DV | Vehicles |
| SS | REPAIR SHOP |
| grc, wtr | Food Stores |
| Oil | Gasoline |
| ctv, net, phn, prk, sec, sto, wst, lwn, pol | Utilities |
| Dpt | Dept Store |
| car, dfp | Car and car related payments |
| Str | Retail - Drug Store |

In another embodiment, "discretionary" transactions may also be further categorized. Table 1.2 (shown below) provides an illustrative organization (i.e., sub-categories) of some "discretionary" transactions.

TABLE 1.2

| Sub-Category | Discretionary Description |
| --- | --- |
| TF | Restaurant |
| FI | Interior Furnishing |
| SR | Recreation |
| EA | Electronic Appliances |
| TH | Lodging, Hotels |
| HS | Hardware |
| DS | Sporting |
| TT | Travel Agencies |
| GMB | Gambling-related |
| LWN | Lawn landscape service |
| POL | Swimming pool services |
| DT | HOBBY, TOY AND GAME SHOPS |
| EA | ELECTRONIC APPLIANCE STORES |
| HS | HARDWARE STORES |
| MO | MAIL ORDER |
| OT | OTHER RETAIL |
| SR | RECREATION |
| TA | AIRLINES |
| TO | OTHER TRANSPORTATION |
| TR | AUTO RENTALS |
| Sub | Retail - Hobby |

Table 1.3 shows an illustrative categorization of savings and/or investment type of transactions.

TABLE 1.3

| Transaction Sub-Category | Savings Description |
|---|---|
| BRK | Brokerage |
| SAV | Savings |
| 529 | 529 plan contribution |
| IRA | Individual Retirement Account (IRA) |
| PEN | Pension/retirement |
| ANU | Annuity |
| BNF | Benefits |
| BNK | Transfer/payment to another bank |
| MON | Money Transfer |
| TST | Trust |
| FIN | Financial institution, Transfers or payments related to financial institutions |
| CRU | Credit Union |

Table 1.4 shows an illustrative organization of debt-like transactions according to one illustrative embodiment.

TABLE 1.4

| Category Sub-Category | Debt Description |
|---|---|
| Dbt | Debt management service |
| mtg | Mortgage |
| Les | Lease |
| lin | Line of credit/HELOC |
| Lon | Loan |
| Crd | Credit card |
| Pmt | Generic payment |
| Pdl | Payday loan |
| lbl | Private label card |
| Fin | Financial institution |
| sln | Student loan |

O one transaction account may be categorized and/or sub-categorized into more than one category, sub-category, or other organizational structure. Further, the categories shown in Tables 1.1-1.4 may not be used to further sub-categorize transactions, but rather to determine which higher level category is utilized. For example, a student loan payment is not required to be sub-categorized into a separate group (such as the illustrative "sln" sub-group), but may be used to confirm that the transaction is properly categorized as "debt" (which is the illustrated group of TABLE 1.4).

As indicated above, the resource transactions being categorized (i.e., block 302) and/or sub-categorized (i.e., block 308) were conducting during a first time period. In one embodiment, the first time period is about 6 months. In one such embodiment, the first time period is the previous 6 months. In another embodiment, a plurality of resource transactions associated with a checking account over about the previous 6-month period are utilized for one or more aspects of this disclosure. In one embodiment, resource transactions from a plurality of different accounts over about the previous 6-month period are utilized. There is no requirement that the first time period be consistent for each embodiment, or even for each type of transaction considered for an embodiment.

In certain embodiments, one or more ratios may be calculated regarding the categorized resource transactions (see, i.e., block 310). Illustrative ratios that may be calculated may include, but are not limited to: debt-to-income, investments-to-income, expenditure-to-income, and combinations thereof. Those skilled in the art with the benefit of this disclosure will understand the mechanisms required to calculate one or more of these ratios and be able to do so without undo experimentation. For example, debt-to-income may determine the ratio of the transaction categorized as "debt" to the transactions categorized as "income" during a specific time period.

The ratio(s) calculated at block 310 or another process may be compared to a threshold value (e.g., at block 312). Illustrative processes will be described below in relation to blocks 314-316, however, various embodiments may have different threshold values, and such threshold values may be calculated through different mechanisms. Further, exemplary threshold determination module 207, shown in FIG. 2, may be used in one or more processes described herein related to determining one or more ratios.

In certain embodiments, a calculation of a dynamic threshold value is envisioned, rather than using a static value. The calculation of a threshold may depend on a myriad of factors, including the resources sought by or which may be extended to the first user. In other embodiments, economic conditions may further adjust the threshold, and as such certain embodiments may use economic indicators in the determination or calculation of the threshold. In certain embodiments, the ratio(s) that were calculated or otherwise received regarding the first user (e.g., block 310) may be calculated for a plurality of individuals. In one embodiment, the plurality of individuals may be at least a portion of individuals that have applied for, requested or are currently applying for or requesting substantially the same resource as a resource the first user is under consideration for (which the user may have applying for consideration). For example, in one embodiment, the first user may be applying for a certain revolving credit account, thus at least a portion of the plurality of individuals may be persons that have also applied for substantially the same revolving credit account. In is therefore, envisioned, but not required that, the first user may be one of the plurality of individuals in accordance with certain embodiments. Alternatively, the first user may not be seeking or requesting the resource, however, one or more processes described herein may be implemented to determine whether the resource, for example, a revolving credit account, should be extended to the first user.

In one embodiment, the plurality of individuals may be selected from one or more of the groups of: (1) people (or accounts) that were offered or given a similar or the same resource; (2) people (or accounts) not extended a similar or same resource; and/or (3) people (or accounts) withdrawn from consideration of the same or a similar resource before the resource was extended or not extended. The resource transactions relating to the plurality of individuals may be selected from the same time period as the resource transactions of the first user (account). For example, resource transactions from the first user and the plurality of individuals may be received that include transactions from previous 6-month time period. In one embodiment, only resource transactions during the previous 6-month time frame are used, whereas older data may not be considered in one or more processes.

In certain embodiments, the resource transactions of the plurality of individuals may be categorized and/or subcategorized, such as for example, according to similar processes described herein in relation to one or more of blocks 302-308. In certain embodiments, the ratio(s) comparison of ratios, such as at block 312 (which may include the comparison of transactional information from other individuals (i.e., may include one or more processes set forth in illustrative blocks 314 and/or 316) may be used to determine whether to provide a resource to the first user. The comparison of ratios may be as simple as determining if a ratio of the first user is exceeds than the ratio of the calculated ratio of other individuals.

As used herein, references to exceeding, being higher than, or meeting a threshold are provided for illustrative purposes to demonstrate the concept of comparing two values against another. Those skilled in the art with the benefit of this disclosure will readily appreciate that a ratio having a relatively high numerical value may "not meet" a threshold of a lower numerical value. In this regard, certain thresholds may be upper numerical thresholds, in which numerically exceeding the value of the threshold is equated to not meeting the threshold. For example, for certain embodiments, having a low debt-to-income ratio is preferable and as such, higher numerical values are less likely to meet a threshold requirement than a lower numerical value.

In certain embodiments, a first ratio, such as a debt-to-income ratio, may be received or calculated. In one embodiment, the result of a comparison of the first ratio is determinative of whether a second ratio is calculated and/or utilized in one or more processes. For example, in one embodiment, a second calculation may already be known, but is not utilized in one or more processes given the outcome of the comparison of the first ratio. In other embodiments, a plurality of ratios, such as including but not limited to: debt-to-income, investments-to-income, expenditure-to-income, and combinations thereof may be considered. In certain embodiments, failure to successfully meet a threshold (or failure to be within certain limits of the threshold) of one ratio may not prevent the calculation and/or application of another ratio. In certain embodiments, a master ratio may be calculated from several individual ratios. In one embodiment, a master ratio is determined from a combination that includes the debt-to-income, investments-to-income, expenditure-to-income ratios. The master ratio may or may not weigh the individual input ratios differently.

In certain embodiments, one or more of these ratios and/or thresholds may be separately and/or collectively analyzed in view of further attributes. The attributes may relate to the user, resource transaction(s), or combinations of both. Alternatively, one or more attributes may not relate to the user or resource transactions. For example, the attributes may relate to measures of economic conditions, whether on the macro- or micro-scale. Attributes may be previously calculated and/or obtained or, alternatively, determined during or after one or more processes disclosed herein. Illustrative attributes may include, for example, credit scores, such as FICO® scores, and/or loan-to-value (LTV) ratios.

In one embodiment, credit applications associated with a certain ratio above a first threshold may be approved, whereas applications not meeting a first threshold but meeting a second threshold may undergo further processing (see decision 317). The second threshold may be another ratio, an external attribute, or combinations thereof. In one embodiment, block 318 may be conducted to determine if a second threshold or condition is met. For example, in one implementation, if the first threshold (or group of thresholds) is met (i.e., block 312), certain embodiments may approve the user for credit (or approved to be set on a faster approval process), and thus may extend a resource to a user (see, e.g., block 320). In one embodiment, if the first threshold (or group of thresholds) is not met, one or more processes may be conducted to determine if further thresholds or conditions are met (block 318). For example, in one embodiment, the LTV and/or credit score, such as a FICO®, may be used to further determine whether to provide a resource or expedite to decision to provide the resource. In one embodiment, a first user failing to meet a first threshold, such as at block 312, that possesses a relatively low FICO® score and a relatively high LTV ratio may be immediately declined from consideration of the resource (block 322). However, a user who fails to meet the first threshold but has a relatively high FICO® score and/or a relatively low LTV ratio may not be immediately declined. Thus, block 324 may be initiated to conduct further analysis. Alternatively, block 320 may be implemented to approve the second user.

While the terms "apparatus" and "system" may be used throughout this disclosure, those skilled in the art with the benefit of this disclosure will readily appreciate that any electronic device having a computer-readable medium and a processor, such as any one or more illustrative devices shown in FIG. 1 and/or FIG. 2 to execute computer-readable instructions on a medium is within the scope of this invention. Further, while one or more apparatuses may be shown to carry out illustrative processes, those skilled in the art will understand that one electronic device may be used rather than several separate and distinct devices. Likewise, the use of illustrative "modules" within the apparatus or electronic devices is provided to more clearly illustrate examples of possible implementations. In this regard, one or more modules may comprise the same processor or computer-readable medium(s).

Aspects of the embodiments have been described in terms of illustrative embodiments thereof. Numerous other embodiments, modifications and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the embodiments. Further, systems and methods disclosed herein may be used in conjunction with a model can be used as a risk alarm in certain instances where a person has been given a resource that should not have been given. Further, those skilled in the art will appreciate that other aspects may be implemented without departing from the scope of this disclosure, such as a graphical user interface (GUI) that may be configurable to provide a way of viewing the data (e.g., the transactional data) in different views in within the scope of this disclosure and may be performed without undo experimentation. For example, summarized information may be viewed by users, financial institutions, and/or parties that are related to a transaction. In certain embodiments, a GUI may be configured to allow a user to view a crossover view of more detailed information regarding one or more resource transactions, ratios, and/or other information disclosed herein.

We claim:

1. A non-transitory computer-readable medium having computer-executable instructions that when executed by a processor configure a system to perform:
   categorizing each of a plurality of resource transactions conducted during a first time period for a first user into a category selected from a plurality of categories, the plurality of categories comprising at least: investment, non-investment expenditure, and income;
   further sub-categorizing non-investment expenditure transactions into a sub-category selected from a plurality of sub-categories, wherein at least one sub-category includes debt transactions;
   determining at least one ratio of the categorized and sub-categorized resource transactions selected from the group consisting of: debt-to-income, investment-to-income, expenditure-to-income, and combinations thereof; and comparing at least one ratio of the resource transactions of the first user with at least one threshold value of the at least one ratio to determine whether to provide a resource to the first user, wherein the calculation of the threshold comprises:
  for each of a plurality of individuals, calculating the at least one ratio of the categorized resource transactions that was calculated for the resource transactions of the first user, wherein the ratio is calculated from categorized resource transactions conducted over a second time period using at least the same categories as the resource transactions of the first user; and
  determining the threshold for the at least one ratio such that at least a portion of the plurality of individuals have a calculated ratio below the threshold.

2. The computer-readable medium of claim 1, wherein the at least one ratio comprises a plurality of ratios selected from the group consisting of: debt-to-income ratio, investment-to-income ratio, expenditure-to-income ratio, and combinations thereof.

3. The computer-readable medium of claim 2, wherein the determination of at least one threshold of a ratio assigns a percentage of at least one calculated ratios of the plurality of individuals below the threshold.

4. The computer-readable medium of claim 2, wherein the sub-categorizing of non-investment expenditures further comprises the subcategories selected from the group consisting of: necessities, discretionary, debt and combinations thereof.

5. The computer-readable medium of claim 1, wherein the at least one ratio comprises the debt-to-income ratio.

6. The computer-readable medium of claim 5, wherein based upon whether the debt-to-income ratio of the first user meets a threshold, determining whether to compare a second ratio of the first user to a threshold, wherein the second ratio is selected from the group consisting of: investments-to-income ratio, expenditure-to-income ratio, and combinations thereof.

7. The computer-readable medium of claim 1, wherein the at least one ratio comprises a plurality of ratios, wherein the plurality of ratios are combined to form a master ratio wherein the plurality of ratios are selected from the group consisting of: debt-to-income ratio, investment-to-income ratio, expenditure-to-income ratio, and combinations thereof.

8. The computer-readable medium of claim 3, wherein the first time period is substantially the same as the second time period.

9. The computer-readable medium of claim 1, wherein the first user is one of the plurality of individuals.

10. The computer-readable medium of claim 1, wherein the resource comprises a credit program and the plurality of individuals are selected from the group consisting of: individuals extended the same credit program, accounts not extended the same credit program, and accounts withdrawn from consideration of the credit program before the credit program was extended or not extended to the individuals, and combinations thereof.

11. The computer-readable medium of claim 2, further comprising:
  receiving a plurality of resource transactions from at least two different user accounts at a first device, wherein the reception of at least a portion of the received plurality of resource transactions is based upon having a first entity identifier.

12. The computer-readable medium of claim 2, wherein the process to determine whether to provide a resource to the first user further comprises:
  adjusting the threshold relating to a ratio based upon an external attribute.

13. A non-transitory computer-readable medium having computer-executable instructions that when executed by a processor configure a system to perform:
  receiving a plurality of categorized electronic resource transactions conducted by a first user during a first time period, the electronic resource transactions being categorized into a plurality of categories comprising at least: investment, non-investment expenditure, and income categories;
  sub-categorizing at least a portion of the non-investment expenditure transactions into one of a plurality of sub-categories comprising: necessities, discretionary, and debt;
  determining at least one ratio of the categorized and sub-categorized electronic resource transactions selected from the group consisting of: debt-to-income, investment-to-income, expenditure-to-income, and combinations thereof;
  comparing at least one ratio of the resource transactions of the first user with at least one threshold value of the at least one ratio to determine whether to provide a resource to the first user, wherein the calculation of the threshold comprises:
    categorizing a plurality of resource transactions conducted by a plurality of individuals during a second time period into one of the same categories as the resource transactions of the first user;
    for each of a plurality of individuals, calculating the at least one ratio of the categorized resource transactions that was calculated for the resource transactions of the first user; and
    determining the threshold such that at least a portion of the plurality of individuals have a calculated ratio below the threshold.

14. The computer-readable medium of claim 13, wherein each of the ratios of: debt to income, investments to income, and expenditure to income are calculated.

15. The computer-readable medium of claim 13, further comprising
  determining not to provide a resource to the first user if at least one ratio of the first user is below the calculated threshold for that at least one ratio is not met.

16. The computer-readable medium of claim 15, further comprising:
  determining not to provide a resource to the first user if at least one ratio of the first user is below the calculated threshold for that at least one ratio is not met.

17. The computer-readable medium of claim 15, further comprising
  determining not to provide a resource to the first user if all of the ratios of the first user are below the calculated threshold for ratios is not met.

18. The computer-readable medium of claim 14, wherein the first user is one of the plurality of individuals.

19. The computer-readable medium of claim 14, wherein the resource comprises a credit program and the plurality of individuals are selected from the group consisting of: individuals extended the same credit program, accounts not extended the same credit program, and accounts withdrawn from consideration of the credit program before the credit program was extended or not extended to the individuals, and combinations thereof.

20. A system comprising:
  a server comprising a transaction categorizer configured to be in operative communication with a communication link to receive information relating to a plurality resource transactions conducted by a first user during a first time period, the transaction categorizer further being configured to categorize the plurality of resource transactions into plurality of categories comprising at least: an investment, a non-investment expenditure, and income;

the transaction categorizer further configured to categorize at least a portion of the non-investment expenditure transactions into one of a plurality of subcategories, at least a portion of the sub-categories being organized by: necessities, discretionary, and debt;

a non-transitory computer-readable medium comprising computer-executable instructions that when executed by a processor is configured to perform:

determining at least one ratio of the categorized and sub-categorized electronic resource transactions selected from the group consisting of: debt to income, investments to income, expenditure to income, and combinations thereof;

comparing at least one ratio of the resource transactions of the first user with at least one threshold value to determine whether to provide a resource to the first user, wherein the calculation of the threshold comprises:

categorizing a plurality of resource transactions of a plurality of individuals over a second time period into at least the same categories as the resource transactions of the first user;

for each of the plurality of individuals, calculating the at least one ratio of the categorized resource transactions that was calculated for the resource transactions of the first user; and determining the threshold with a threshold determination module such that at least a portion of the plurality of individuals have a calculated ratio below the threshold.

* * * * *